United States Patent
Galeazzi

(10) Patent No.: US 8,222,837 B2
(45) Date of Patent: Jul. 17, 2012

(54) AMBIENCE LIGHTING SYSTEM FOR A DISPLAY DEVICE AND A METHOD OF OPERATING SUCH AMBIENCE LIGHTING SYSTEM

(75) Inventor: Guido Galeazzi, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 422 days.

(21) Appl. No.: 12/600,049

(22) PCT Filed: May 20, 2008

(86) PCT No.: PCT/IB2008/051973
§ 371 (c)(1),
(2), (4) Date: Nov. 13, 2009

(87) PCT Pub. No.: WO2008/142639
PCT Pub. Date: Nov. 27, 2008

(65) Prior Publication Data
US 2010/0213877 A1    Aug. 26, 2010

(30) Foreign Application Priority Data
May 22, 2007   (EP) ..................................... 07108618

(51) Int. Cl.
*H05B 37/00* (2006.01)
(52) U.S. Cl. ........ 315/318; 315/312; 315/299; 315/308; 348/602; 348/603; 348/511; 348/708
(58) Field of Classification Search .................. 348/500, 348/511, 515, 557, 563, 602, 603, 708, 739; 315/312, 318, 319, 294, 299, 307, 308; 362/97.1; 345/214
See application file for complete search history.

(56) References Cited

U.S. PATENT DOCUMENTS

| | | | |
|---|---|---|---|
| 6,611,297 | B1 | 8/2003 | Akashi et al. |
| 7,009,348 | B2 * | 3/2006 | Mogilner et al. ............. 315/307 |
| 7,014,336 | B1 | 3/2006 | Ducharme et al. |
| 7,071,897 | B2 | 7/2006 | Bronson |
| 7,859,595 | B2 * | 12/2010 | Gutta et al. ................... 348/603 |
| 2002/0047628 | A1 | 4/2002 | Morgan et al. |
| 2002/0057061 | A1 | 5/2002 | Mueller et al. |
| 2006/0077193 | A1 | 4/2006 | Thielemans et al. |
| 2007/0091111 | A1 | 4/2007 | Gutta |
| 2009/0167942 | A1 * | 7/2009 | Hoogenstraaten et al. ... 348/500 |
| 2009/0303229 | A1 * | 12/2009 | Kwisthout et al. ............ 345/214 |
| 2011/0260626 | A1 * | 10/2011 | Matthys ........................ 315/152 |

FOREIGN PATENT DOCUMENTS

WO    2005062608 A2    7/2005

(Continued)

*Primary Examiner* — Haiss Philogene
(74) *Attorney, Agent, or Firm* — Shimokaji & Assoc., PC

(57) ABSTRACT

This invention relates to an ambience lighting system for use in conjunction with a display device including an image display region. A central control receives an incoming audio video stream (AVS) and to determines color information at the periphery of the image to be displayed. Light sources are disposed in a pre-fixed arrangement in relation to the periphery of the image display region, and local control units are coupled to open or more light sources selected from the multiple light sources for locally operating the at least one coupled light source. The central control unit is adapted to transmit the determined color information as a stream to each respective local control unit, which use a portion of the received color information to operate the at least one coupled light source, the portion being determined based on the position of the at least one coupled light source within the pre-fixed arrangement.

11 Claims, 8 Drawing Sheets

FOREIGN PATENT DOCUMENTS

| | | |
|---|---|---|
| WO | 2005069638 A1 | 7/2005 |
| WO | 2005069640 A1 | 7/2005 |
| WO | 2006003604 A1 | 1/2006 |
| WO | 2006081186 A2 | 8/2006 |

* cited by examiner

AMBIENCE LIGHTING SYSTEM FOR A DISPLAY DEVICE AND A METHOD OF OPERATING SUCH AMBIENCE LIGHTING SYSTEM

FIELD OF THE INVENTION

The present invention relates to an ambience lighting system for use in conjunction with a display device including an image display region and a method of operating such an ambience lighting system.

BACKGROUND OF THE INVENTION

WO 2005/062608 discloses a supplementary visual display system for use in conjunction with a display device. Such a visual display system is today often referred to as ambilight system. Such ambilight systems typically include two or four light sources which are arranged at the sides/tops of the display device. As depicted in FIG. 1, a central control unit 11 is coupled to four light sources 12-15 and operates the light sources by analyzing the periphery of the incoming Audio/Video Signal (AVS) 10 of the image to be displayed and based thereon emits light on the wall behind the TV or emits light through the frame of the TV that matches the video being shown. The effect is larger virtual screen and a more immersive viewing experience.

The prior art ambience lighting system are thus operated via the central control unit, which instructs each individual light source to emit a light based on analyzing the AVS. This can however cause problem when the number of light sources is large because the central control unit must be connected to each individual light source. A connection to e.g. several hundreds of light sources is hardly possible to arrange from a central point because of the huge amount of wires that has to be distributed to all light sources.

SUMMARY OF THE INVENTION

The object of the present invention is to overcome the above mentioned drawbacks by providing an ambience lighting system that is suitable when the number of light sources is large.

According to one aspect the present invention relates to an ambience lighting system for use in conjunction with a display device including an image display region, comprising:
  a central control unit adapted to receive an incoming audio video stream (AVS) and to determine color information at the periphery of the image to be displayed,
  multiple light sources disposed in a pre-fixed arrangement in relation to the periphery of the image display region,
  multiple local control units each being adapted to be coupled to at least one light source selected from the multiple light sources for locally operating the at least one coupled light source,
  wherein the central control unit transmits the determined color information as a stream to each respective local control unit, each respective the local control unit being adapted use a portion of the received color information to operate the at least one coupled light source, the portion being determined based on the position of the at least one coupled light source within the pre-fixed arrangement.

Accordingly, since the operating is divided between the central control unit and the local control units which operate locally and independently of each other, it is possible to operate a large number of light sources.

In one embodiment, at least one of the local control units operate the at least one coupled light source further based on light source related operation parameter.

In one embodiment the central control unit adjusts the colors to be emitted to user's preferences or on automated base for all local control units. As an example, if the color information indicates that the color to be displayed at a particular area on image display region is red, the user preference might be to emit reddish light. This may depend e.g. on the wall where the display device, e.g. LCD screen is located, or the environmental light conditions might encourage the user to make specific preferences such that the color at the periphery and the emitted color fits to the wall color. Sensor technology allows doing settings in automated or semi automated way.

In one embodiment, the light sources include an array of sub-light sources, the pre-determined areas being those areas to which the sub-lights sources are associated to.

In that way, it is possible to make a very clear extension of the image that is being displayed.

In one embodiment, the sub-light sources are Light Emitting Diodes (LED's).

In one embodiment, the multiple local control units are connected in parallel, or in series, or combination thereof.

According to another aspect, the present invention relates to a display device comprising said ambience lighting system.

According to still another aspect, the present invention relates to a frame structure for a display device comprising said lighting system integrated therein.

In one embodiment, the frame structure further comprises a synthetic plate or a glass, the emitted light from the light sources being conducted into or within the synthetic plate or a glass.

According to yet another aspect, the present invention relates to a method of operating an ambience lighting system when used in conjunction with a display device including an image display region, the method comprising:
  receiving an incoming audio video stream (AVS) and determining color information at the periphery of the image to be displayed,
  disposing multiple light sources in a pre-fixed arrangement in relation to the periphery of the image display region,
  transmitting the determined color information as a stream to local control units, each respective control unit being coupled to at least one light source selected from the multiple light sources,
  wherein a portion of the received color information is used by each respective local control unit to operate the at least one coupled light source, the portion being determined based on the position of the at least one coupled light source within the pre-fixed arrangement.

According to yet another aspect, the present invention relates to a computer program product for instructing a processing unit to execute the above mentioned method steps when the product is run on a computer The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF EMBODIMENTS

Figure 2:
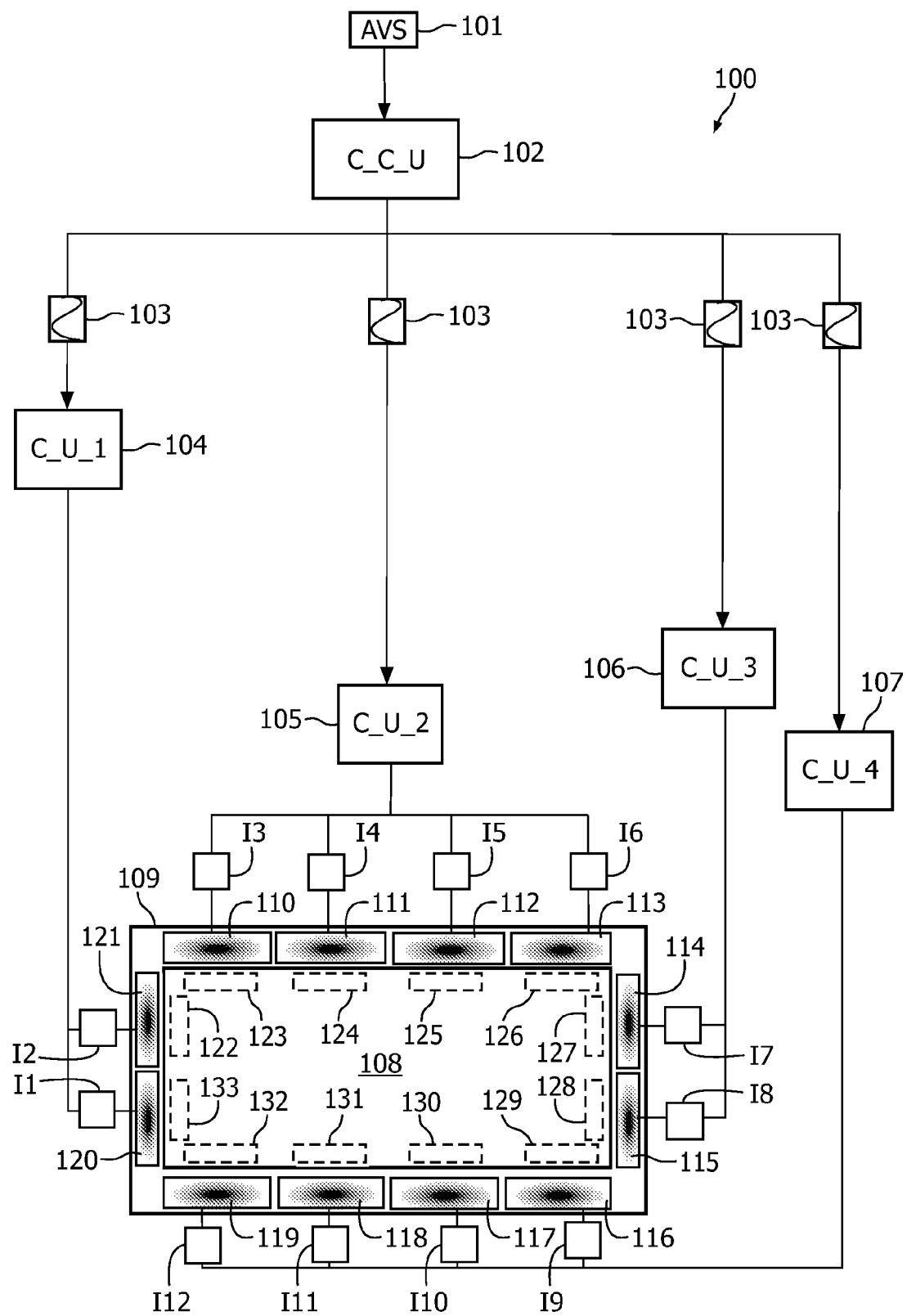
FIG. 2 shows an embodiment of an ambience lighting system according to the present invention for use in conjunction with a display device including an image display region.

FIG. 2 shows one embodiment of an ambience lighting system according to the present invention 100 for use in conjunction with a display device 109 including an image display region 108, where the system 100 comprises a central control unit (C_C_U) 102, light sources 110-121 and local control units (C_U_1-4) 104-107, which in this embodiment are connected in parallel. The central control unit (C_C_U) 102 receives an incoming audio video stream (AVS) 101 and determines color information at the periphery of the image to be displayed on the image display region 108. As depicted here, the determination of the color information is performed at areas 122-133, which are all positioned at the border of the active image. The determined color information may thus comprise determining the average color within each respective area 122-133, or determining the color information at a particular point within each respective area, e.g. at the center part of each respective area.

The determined color information is pre-adjusted to system settings making use of a matrix. This is preferably done in all local control units which all require a matrix for color alignment. It is namely so that the locally adjusted colors and white point are per definition not the same as those of the display, e.g. LCD since backlight and LCD itself may vary from type or supplier.

In the central control unit is a matrix where alignment is done to user requirements which are initial display coordinates but may also be coupled with environmental light corrections or user preferred settings. The local adjusted light sources produce more saturated colors at it's primaries to have margins to produce more saturated light when this is wished too.

These determined color information are transmitted as a parallel stream 103 to each respective local control unit 104-107. In this particular example, the color information (e.g. the average color information within each respective area) is transmitted as whole to each respective local control unit (C_U_1-4) 104-107.

The local control units (C_U_1-4) 104-107 are coupled to one or more light sources and work independent of each other. As shown here, the light sources are disposed in a pre-fixed arrangement, or in a "chain", in relation to the periphery of the display such that each respective light source is associated to a given area 122-133. This means that e.g. light source 110 is associated to area 123 and light source 111 is associated to area 124. Thus, the light sources may be assigned to a given coordinate position. These coordinates are implemented by the local control units 104-107 to know which parts of the received color information are to be used to operate the coupled light sources. It is actually this that makes the local control units 104-107 to operate independently.

As shown in this embodiment, the local control unit (C_U_1) 104 is coupled to two light sources 120-121 on the left side of the display region 108, local control unit (C_U_2) 105 is coupled to four light sources 110-113 above the display region 108, the local control unit (C_U_3) 106 is coupled to two light sources 119-120 on the right side 114-115 of the display region 108 and the local control unit (C_U_4) 107 is coupled to four light sources 116-119 below the display region 108. Accordingly, the color information that is relevant for local control unit (C_U_1) 104 is for areas 133 and 122 because control unit (C_U_1) 104 is coupled to the light sources which are associated to these two areas, namely light source 120 and 121. In the same way, the color information that is relevant for local control unit (C_U_2) 105 is for areas 123-126, since the control unit (C_U_2) 105 is coupled to the four light sources 110-113 associated to these areas. The same applies for control units (C_U_3-4) 106-107.

Each respective local control unit 104-107 uses thus only the color information i1-i12 for the relevant areas 122-133. One way of doing so is by "stripping off" or filtering out those color information that are not relevant. As an example for local control unit (C_U_2) 105 only the color information at areas 123-126 are relevant. One way of doing such "stripping" is by using an appropriate algorithm. An example of such "stripping" will be given later.

Accordingly, local control unit (C_U_1) 104 uses the color information determined for area 133 and 122 to operate light sources 120 and 121, respectively. The same applies for the subsequent local control units 105-107, e.g. local control unit (C_U_2) 105 uses the color information determined for area 123-126 to operate light sources 123-126, respectively. In that way, the local control units are triggered when they receive the parallel stream and take out their part of information, so the way they are located in the "chain" decides which part to implement.

In one embodiment, the central control unit (C_C_U) 102 is aware of the location of each respective local control unit 104-107 in the chain, i.e. to which light sources the local control units are associated and the location of each respective light sources. Thus, the central control unit (C_C_U) 102 can be adapted to instruct the local control unit 104-107 which parts of the color information to use. Therefore, the local control units 104-107 are triggered when they receive the stream 103 and take out their part of information, e.g. local control unit (C_U_1) 104 uses only the color information at areas 133, 122 etc.

In one embodiment the local control units 104-107 are pre-programmed to filter out specific parts of the received stream 103 based on their location in the "chain", e.g. local control unit (C_U_1) 104 automatically filters out all the color information except those for areas 133, 122. Similar applies for the subsequent local control units.

Figure 3:
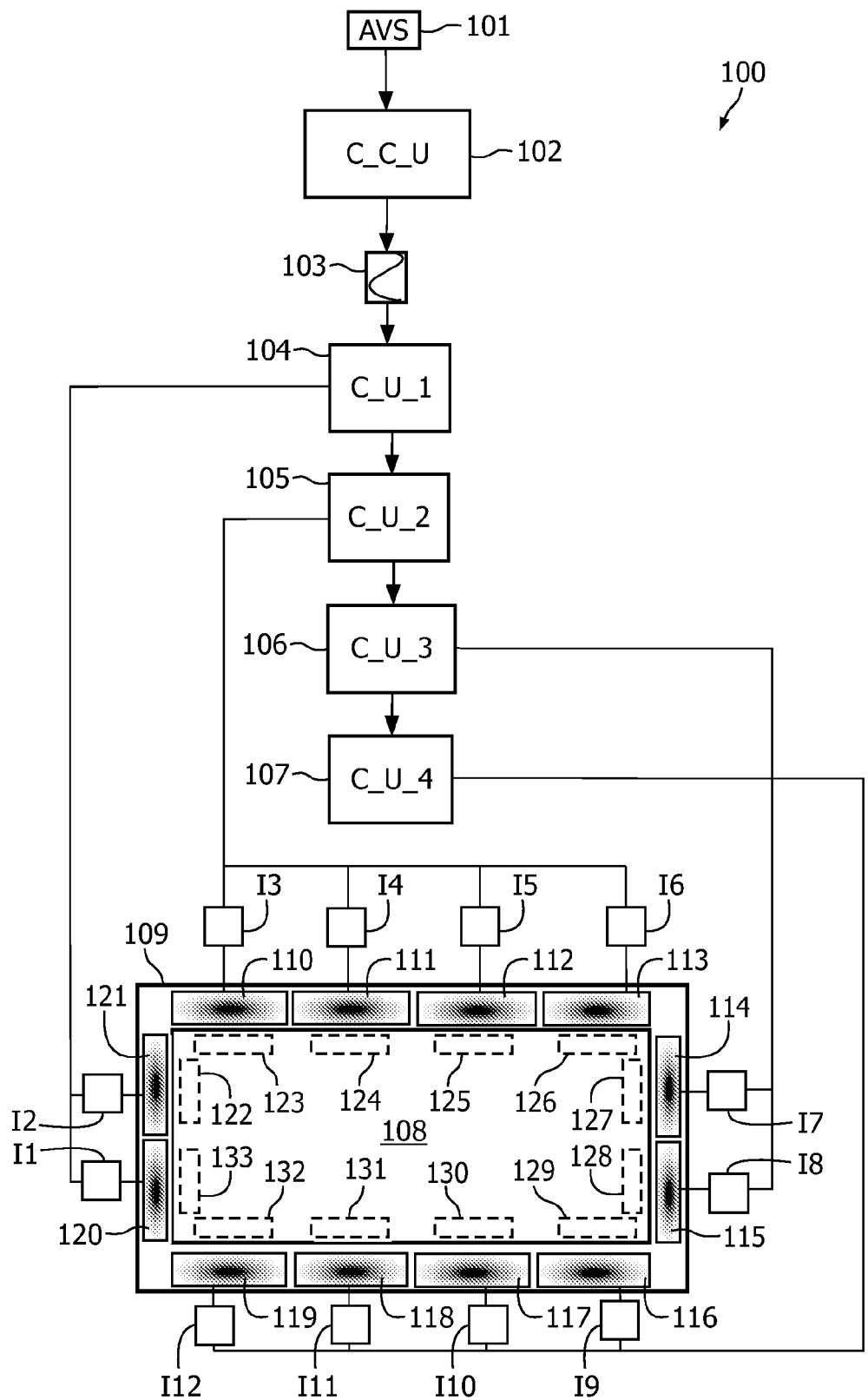
FIG. 3 shows another embodiment of an ambience lighting system according to the present invention.

FIG. 3 shows another setup of the system from FIG. 2, where the only difference is the connection of the local control units 104-107. As mentioned previously, the local control units 104-107 are connected parallel in FIG. 2, but as shown in FIG. 3 they are connected series. Accordingly, each respective local control unit extract the relevant color information needed, but forwards the received color information 103 to the subsequent local control unit. As depicted here, local control unit (C_U_1) 104 forwards the color information to (C_U_2) 105 which forwards it to local control unit (C_U_3)

106 etc. The functioning of the ambience lighting system in FIG. 3 is otherwise the same as disclosed in FIG. 2.

Figure 4:
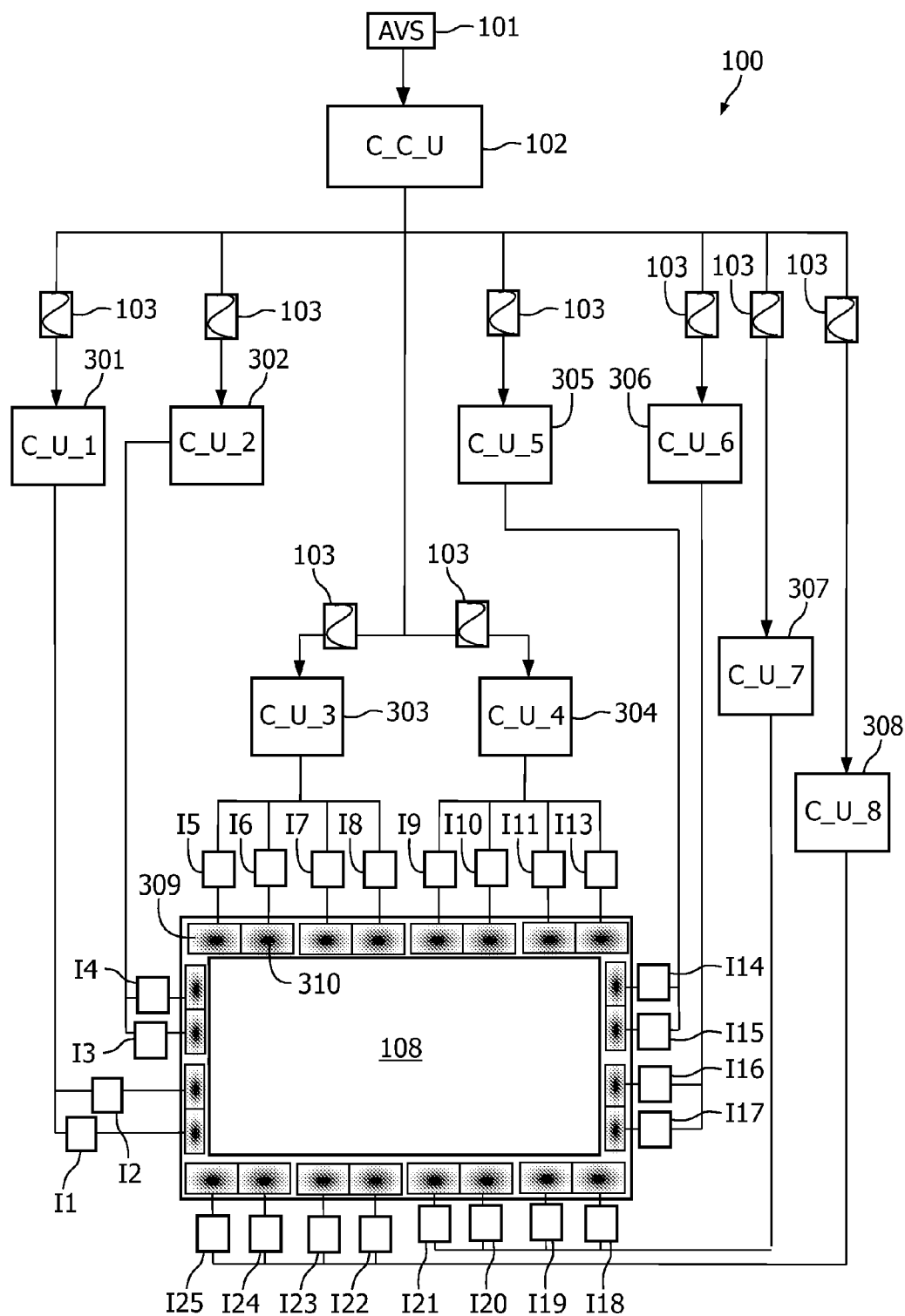
FIG. 4 shows another example of implementing the present invention, where the number of light sources has been increased.

FIG. 4 shows another example of implementing the present invention, where the number of light sources 309-310 has been increased from 12 to 24, and the number of local control units 301-308 has been increased from 4-8. As shown here, the local control units are connected in parallel, but can of course just as well be connected in series. The same principle applies here as discussed previously under FIGS. 2 and 3.

Figure 5:
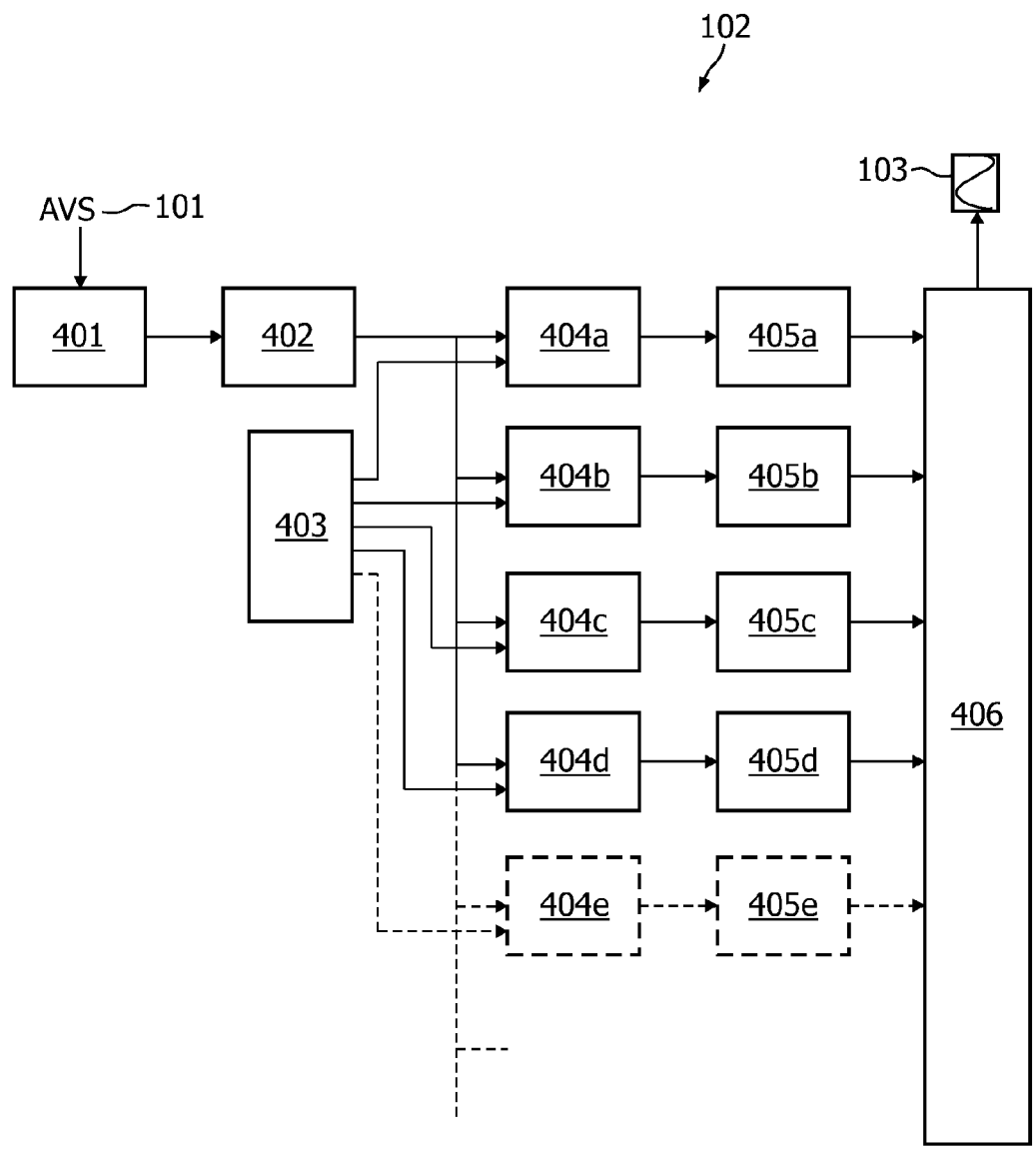
FIG. 5 shows a block diagram depicting graphically the functioning of the central control unit in FIGS. 2-4.
Figure 7:
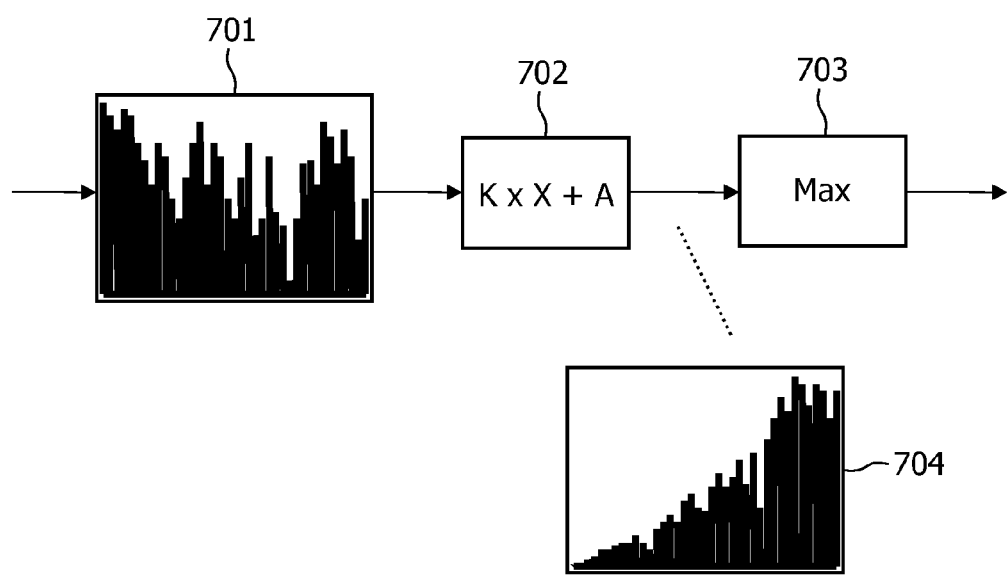
FIG. 7 depicts one way of determining average color values.

FIG. 5 shows a block diagram depicting graphically the functioning of the central control unit 102 in FIGS. 2-4, which comprises matrix algorithm 401, gamma algorithm 402, an active area 403, first column of average algorithms 404a-404e, a second column of integration algorithms 405a-405e and a serializer 406. The matrix 401 transfers the incoming video to user or system required settings. Gamma Algorithm transfers the video to linear light domain since video is always gamma corrected. Active Area indicators are used to indicate which area is currently active related to the video stream. The average algorithm can be the peak algorithm as described in WO 2005/062608, hereby incorporated by reference, but here it is the algorithm as shown in FIG. 7, which is histogram based.

Figure 6:
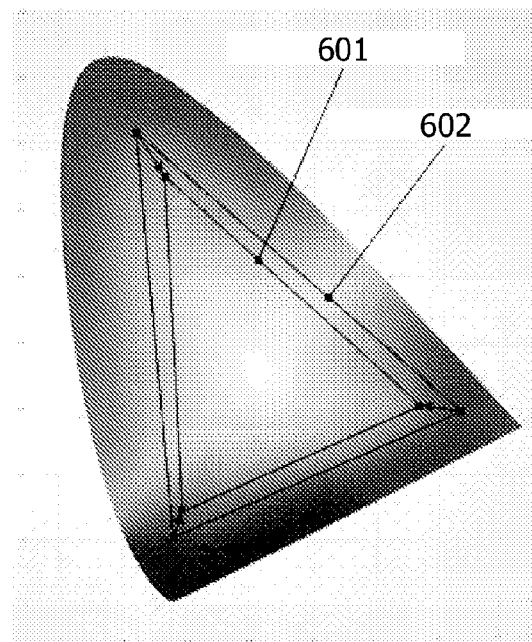
FIG. 6 shows a color triangle showing a display adapted triangle vs. light source color triangle.

The central control unit 102 may be adapted to perform system corrections, general functions and non area bounded functions. The color information determined from the received AVS signal 101 is pre-adjusted to the system and/or user settings making use of a matrix algorithm 401, which aligns the color matrix of all light sources either to EBU or display color triangle shown in FIG. 6, where an example of a display adapted triangle is shown 601 and light source, e.g. LED, color triangle 602. The individual light sources are aligned with local matrix to fixed color coordinates. This matrix may also be required to compensate environmental light effects. The matrix may be system and application controlled. The matrix algorithm could read as following:

$$red\_out = \{Gr \times red\_in + Gg \times Cgr \times green\_in + Gb \times Cbr \times blue\_in\}$$

$$green\_out = \{Gg \times green\_in + Gr \times Crg \times red\_in + Gb \times Cbg \times blue\_in\}$$

$$blue\_out = \{Gb \times blue\_in + Gr \times Crb \times red\_in + Gg \times Cgb \times green\_in\}$$

The gamma algorithm 402 converts the video signal in linear light domain by the gamma algorithm:

$$red\_out = red\_in^2$$

$$green\_out = green\_in^2$$

$$blue\_out = blue\_in^2$$

The active area block indicates which area is active in the video stream. It is a central support of the average algorithm 404, 405.

The average algorithms 404-405 calculate the average value per color. Three algorithm types can be used for this. The first algorithm is where the classical average is determined by the equation: average=ΣInputs/n, where Inputs stand for stand for a single color and valid for a single area and n stands for the amount of entrances.

The second algorithm makes this calculation by the following equation:

$$peak\_new := peak\_current + input/K \text{ when } input > peak\_current/K \text{ else } peak\_new = peak\_current.$$

Peak_current is the actual value for a single color and valid for a single area. Each time a area valid color for that enters it is compared if this is bigger than the actual value. When this is the case, a portion of it is added to the actual value to become the new actual value. This is described in more details in WO 2005/062608.

The third way to determine the peak value makes use of a weighted histogram 704 shown in FIG. 7. For each color and each area 122-133 (see FIG. 2) a histogram is determined. The histogram is multiplied with a non linear function 702 to give more intensive pixels a higher weight than dark pixels. The highest number of occurrences per color is depicted for the peak value. Each input per color and channel is integrated in a sequential order using next algorithm.

$$int\_new = K \times peak\_in + (1-K) \times int\_current. \ K = Krise \text{ when } int\_new > int\_current \text{ and } K = Kfall \text{ when } int\_new < int\_current.$$

K stands for coefficient. This coefficient is set up by the system and determines the way ambilight responds to the video. This can be from slow to fast acting Coefficients for a new input>current value is different than the coefficient for a new input<current value. These coefficients can be integral the same for all integrators but can also be different for each integrator and for example be coupled to image related data.

Figure 1:
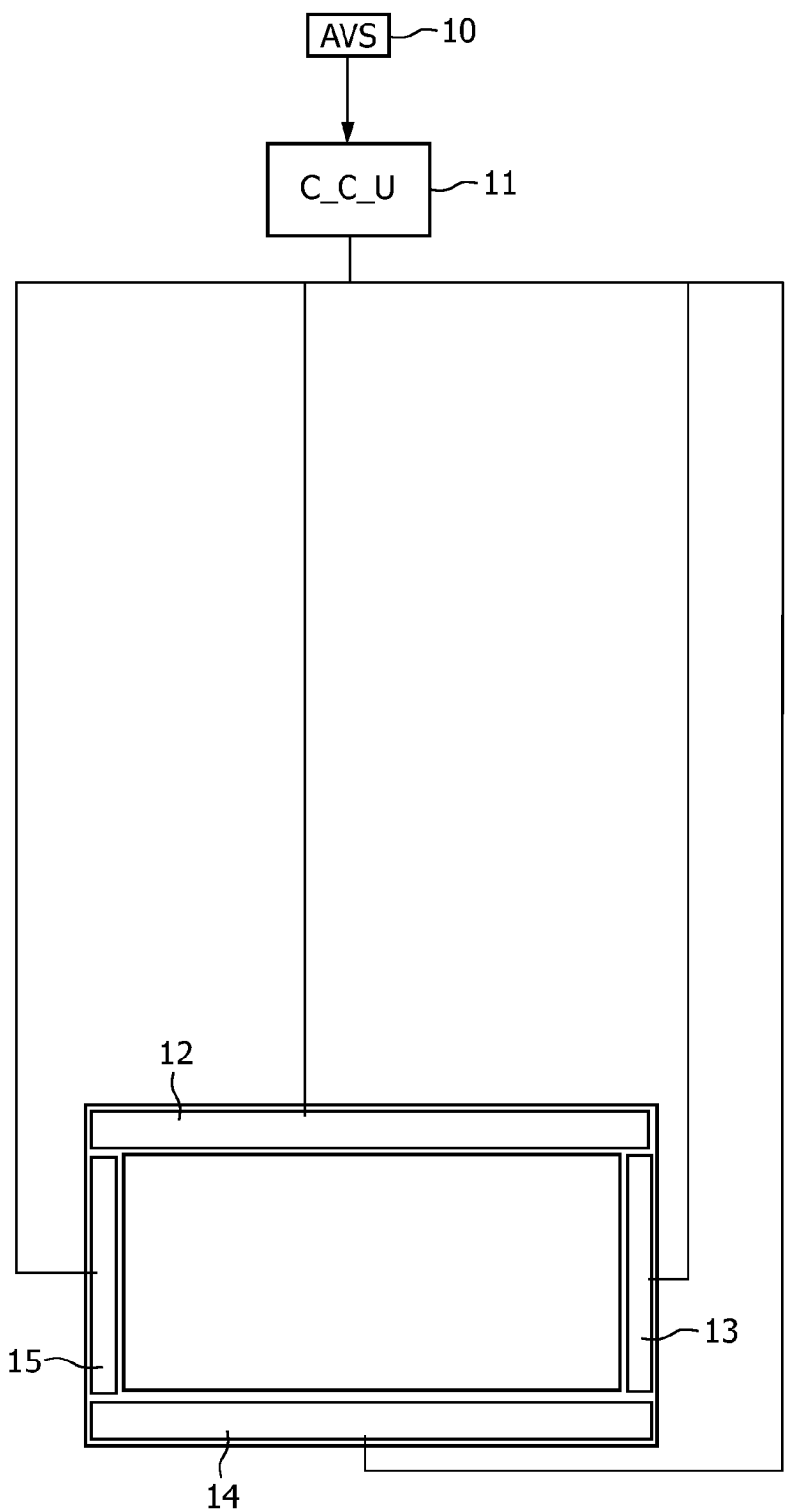
FIG. 1 depicts graphically the functioning of prior art ambience lighting system.

The integrated average per color and area 122-133 is distributed to all local control units (e.g. 104-107 in FIG. 2) via the serializer 406 shown in FIG. 5. The way it is distributed in the serializer is system configurable. Configuration items are clock wise or counter clock wise distribution, the sequence of red, green and blue and the start corner like top left, top right, bottom left or bottom right. To reduce the amount of connection points, the data stream is serialized into active, clock and data. Each local control unit collects the total stream and strips out a precise defined partition, as discussed previously. Each receptor shift out what is left. The order of the order chain configuration, determines which data receives at what receptor. When all local controllers are connected like FIG. 1 they do and the pre programmed setting determines which portion to strip out. In a configuration depicted in FIG. 3 each controlled strips out the first entered portion and retransmit the rest to the next local controller. In that way the place in the chain determines the position.

Figure 8:
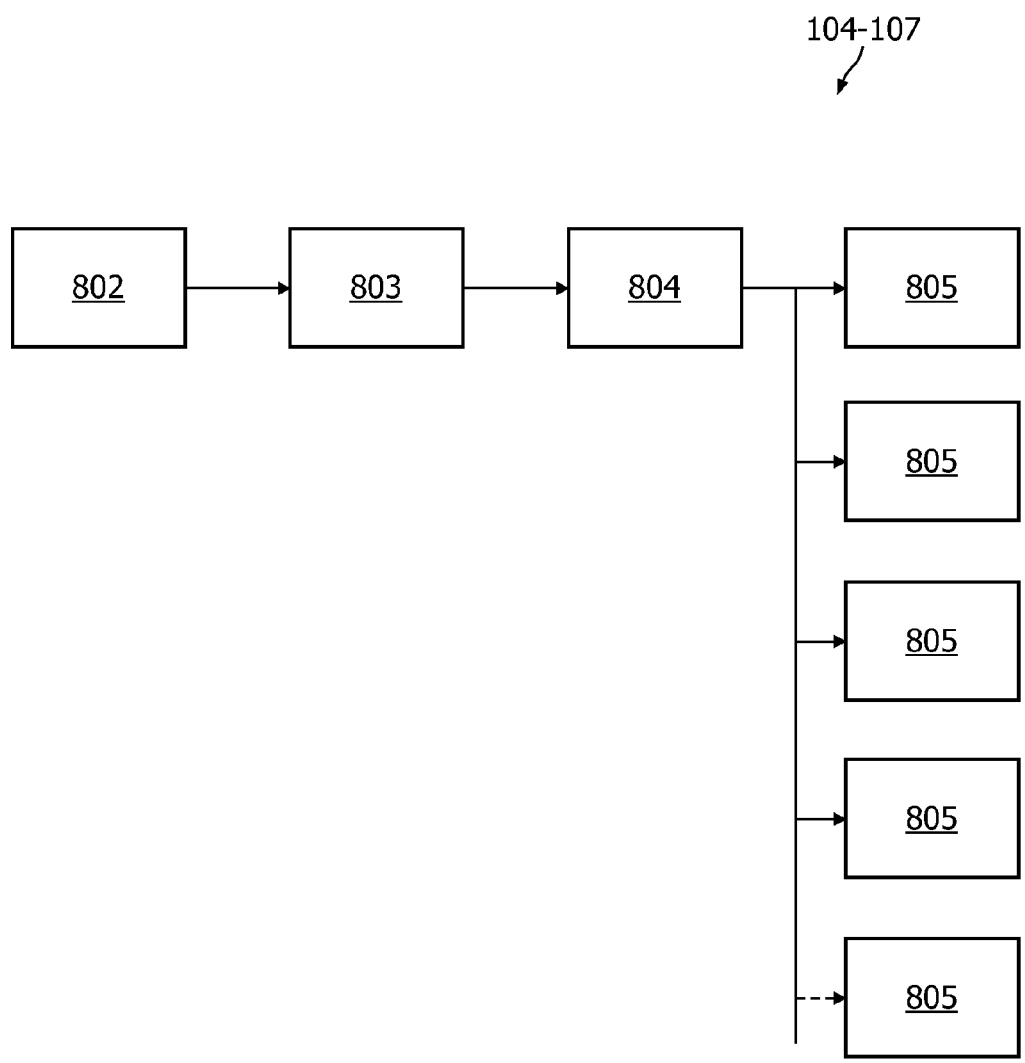
FIG. 8 shows a block diagram depicting graphically the functioning of a local control unit.

FIG. 8 shows a block diagram depicting graphically the functioning of a local control unit 104-107 shown e.g. in FIGS. 2-4. The minimum size one local control unit receives 800 is a single average value for red green and blue. The local control unit can also strip X times red green and blue average values 802. For that the structure that each local control unit strips out what is needed for the local control unit and shifts out the residue allows a lot of flexibility and simplicity in providing information from a central point 102 to multiple local control units 104-107 with different internal receptor length. To be able to adapt color coordinates and white point per light source, one matrix 803 per RGB light source is required. The matrix is sequentially used for each RGB light source. Advantage of a separate and local matrix 803 is the possibility to adjust the light source module on a different location as where they are assembled. In that case production and alignment can be sub contracted.

Algorithm in local control unit:

$$red\_out = Gr \times red +/- Gg \times Cgr \times green +/- Gb \times Cbr \times blue$$

$$green\_out = Gg \times green +/- Gr \times Crg \times red +/- Gb \times Cbg \times blue$$

$$blue\_out = Gb \times blue +/- Gr \times Crb \times red +/- Gg \times Cgb \times green$$

Physical corrections 804 stands for temperature related luminance drift correction and aging correction.

Pulse code modulators 805 drive the current sources that on its hand drive the light sources. Pulse code is the general term and is in regular a pulse width modulator.

Figure 9:
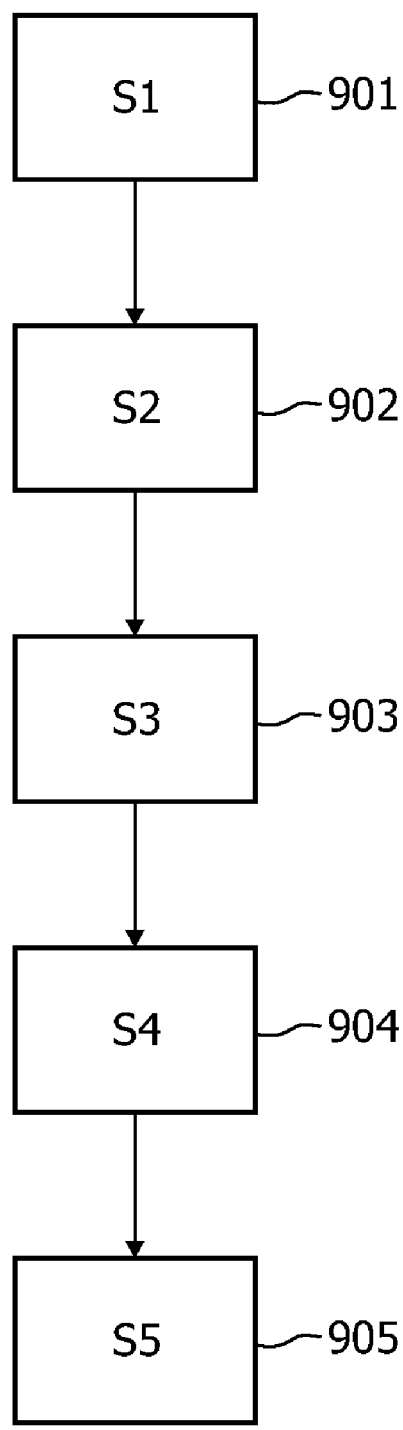
FIG. 9 shows a flowchart illustrating the method according to the present invention.

FIG. 9 shows a flowchart illustrating the method according to the present invention to operate an ambience lighting system when used in conjunction with a display device including an image display region.

An incoming audio video stream (AVS) is received (S1) 901 and based thereon, the color information at the periphery of the image to be displayed is determined (S2) 902.

Multiple light sources are disposed (S3) 903 in a pre-fixed arrangement in relation to the periphery of the image display region. The determined color information are transmitted as a serial or a parallel stream (S4) 904 to local control units, each respective control unit being coupled to at least one light source selected from the multiple light sources. A portion of the received color information is used (S5) 905 by each respective local control unit to operate the at least one coupled light source, the portion being determined based on the position of the at least one coupled light source within the pre-fixed arrangement.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. An ambience lighting system (100) for use in conjunction with a display device (109) including an image display region (108), comprising:
   a central control unit (102) adapted to receive an incoming audio video stream (AVS) (101) and to determine color information at the periphery of the image to be displayed in the image display region,
   multiple light sources (110-121) disposed in a pre-fixed arrangement in relation to the periphery of the image display region (108),
   local control units (104-107) each being adapted to be coupled to at least one light source (220-121) selected from the multiple light sources for locally operating the at least one coupled light source,
   wherein the central control unit (102) transmits the determined color information as a stream (103) to each respective local control unit (104-107), each respective local control unit being adapted to use a portion of the received color information to operate the at least one coupled light source, the portion being determined based on the position of the at least one coupled light source within the pre-fixed arrangement.

2. An ambience lighting system according to claim 1, wherein at least one of the local control units (104-107) operate the at least one coupled light source (110-121) further based on light source related operation parameter.

3. An ambience lighting system according to claim 1, wherein the central control unit (102) adjusts the colors to be emitted to user's preferences or on automated base for all local control units.

4. An ambience lighting system according to claim 1, wherein the light sources include an array of sub-light sources, the pre-determined areas being those areas to which the sub-lights sources are associated to.

5. An ambience lighting system according to claim 4, wherein the sub-light sources are Light Emitting Diodes (LED's).

6. An ambience lighting system according to claim 1, wherein the multiple local control units (104-107) are connected in parallel, or in series, or combination thereof.

7. A display device (109) comprising an ambience lighting system as claimed in claim 1.

8. A frame structure for a display device comprising the lighting system as claimed in claim 1 integrated therein.

9. A frame structure according to claim 8, wherein the frame structure further comprises a synthetic plate or a glass, the emitted light from the light sources being conducted into or within the synthetic plate or the glass.

10. A method of operating an ambience lighting system when used in conjunction with a display device including an image display region, the method comprising:
    receiving an incoming audio video stream (AVS) (901) and determining color information (902) at the periphery of the image to be displayed in the image display range,
    disposing (903) multiple light sources in a pre-fixed arrangement in relation to the periphery of the image display region,
    transmitting the determined color information (904) as a stream to local control units, each respective control unit being coupled to at least one light source selected from the multiple light sources,
    wherein a portion of the received color information is used (905) by each respective local control unit to operate the at least one coupled light source, the portion being determined based on the position of the at least one coupled light source within the pre-fixed arrangement.

11. A computer program product for instructing a processing unit to execute the method step of claim 10 when the product is run on a computer.

* * * * *